United States Patent [19]
Bard et al.

[11] Patent Number: 5,536,925
[45] Date of Patent: Jul. 16, 1996

[54] OPTICAL SCANNER WITH SCANNING LIGHT BEAM AND DETECTOR FIELD OF VIEW

[75] Inventors: Simon Bard, Stony Brook; Yajun Li, Oakdale; Jerome Swartz, Old Field; Boris Metlitsky; Joseph Katz, both of Stony Brook; Askold Strat, Patchogue; Hal Charych, East Setauket, all of N.Y.

[73] Assignee: Symbol Technologies, Inc., Bohemia, N.Y.

[21] Appl. No.: 218,959

[22] Filed: Mar. 28, 1994

Related U.S. Application Data

[60] Division of Ser. No. 897,664, Jun. 12, 1992, Pat. No. 5,374,817, which is a continuation-in-part of Ser. No. 787,458, Nov. 4, 1991, abandoned, which is a continuation-in-part of Ser. No. 699,417, May 13, 1991, Pat. No. 5,191,197, which is a continuation-in-part of Ser. No. 193,265, May 11, 1988, Pat. No. 5,144,120.

[51] Int. Cl.[6] .................................................. G06K 7/10
[52] U.S. Cl. ........................................ 235/462; 235/472
[58] Field of Search ...................................... 235/462, 472

[56] References Cited

U.S. PATENT DOCUMENTS

| | | |
|---|---|---|
| 1,438,974 | 12/1922 | Wente . |
| 1,980,888 | 11/1934 | Thomas . |
| 2,290,529 | 1/1960 | Blythe . |
| 3,508,814 | 4/1970 | Aas . |
| 3,532,408 | 10/1970 | Dostal . |
| 3,544,201 | 12/1970 | Fowler et al. . |
| 3,612,642 | 10/1971 | Dostal . |
| 3,614,677 | 10/1971 | Willfinger . |
| 3,700,304 | 10/1972 | Dostal et al. . |
| 3,758,199 | 9/1973 | Thaxter . |
| 3,794,410 | 2/1974 | Elliott . |
| 3,902,783 | 9/1975 | Bodlaj . |
| 3,981,566 | 9/1976 | Frank et al. . |
| 3,988,092 | 12/1976 | Maccabee . |
| 4,025,203 | 5/1977 | Lee . |
| 4,170,397 | 10/1979 | Botcherby . |
| 4,230,393 | 10/1980 | Burke, Jr. . |
| 4,251,798 | 2/1981 | Swartz et al. . |
| 4,360,798 | 11/1982 | Swartz et al. . |
| 4,369,361 | 1/1983 | Swartz et al. . |
| 4,387,297 | 6/1983 | Swartz et al. . |
| 4,409,470 | 10/1983 | Shepard et al. . |
| 4,436,364 | 3/1984 | Lauer et al. . |
| 4,460,120 | 7/1984 | Shepard et al. . |
| 4,496,831 | 1/1985 | Swartz et al. . |
| 4,577,131 | 3/1986 | Sobbitsky . |
| 4,578,571 | 3/1986 | Williams ................................ 235/472 |
| 4,593,186 | 6/1986 | Swartz et al. . |
| 4,607,156 | 8/1986 | Koppenaal et al. . |
| 4,673,803 | 6/1987 | Zerle et al. . |
| 4,708,420 | 11/1987 | Liddiard . |
| 4,746,095 | 4/1988 | Shepard et al. . |

(List continued on next page.)

FOREIGN PATENT DOCUMENTS 265221 10/1989 Japan ...................................... 359/198

OTHER PUBLICATIONS

Grabowski et al, Code Reading Mechanical Scanning Gun, IBM Technical Disclosure Bulletin, vol. 5 No. 5 Oct. 1962.

O'Shea, D., "Modulation and Scanning," *Elements of Modern Optical Design*, pp. 284–285.

Primary Examiner—John Shepperd
Attorney, Agent, or Firm—Lowe, Price, LeBlanc & Becker

[57] ABSTRACT

An optical reading system for reading optically encoded information represented by a symbol on a target includes a rotational shaft, a light emitter for producing a beam of light to scan a path through a scan field, and a light detector for detecting light reflected from the symbol to read the optically encoded information. A means for oscillating the light emitter and light detector about a longitudinal axis of the rotational shaft is also provided. At least one electrical conductor is connected to each of the light emitter and light detector for providing electrical energy thereto. Each electrical conductor is affixed between distal ends thereof at a point coincident with a point on the longitudinal axis of the rotational shaft.

31 Claims, 3 Drawing Sheets

U.S. PATENT DOCUMENTS

| | | |
|---|---|---|
| 4,758,717 | 7/1988 | Shepard et al. . |
| 4,760,248 | 7/1988 | Swartz et al. . |
| 4,769,803 | 9/1988 | Yamamya . |
| 4,775,815 | 10/1988 | Heinz . |
| 4,778,233 | 10/1988 | Christenson et al. . |
| 4,784,448 | 11/1988 | Sepp et al. . |
| 4,806,742 | 2/1989 | Swartz et al. . |
| 4,808,804 | 2/1989 | Krichever et al. . |
| 4,816,660 | 3/1989 | Swartz et al. . |
| 4,816,661 | 3/1989 | Krichever et al. . |
| 4,845,350 | 7/1989 | Shepard et al. . |
| 4,871,904 | 10/1989 | Metlitsky et al. . |
| 4,902,083 | 2/1990 | Wells . |
| 4,923,281 | 5/1990 | Krichever et al. . |
| 5,015,831 | 5/1991 | Eastman et al. ................... 235/462 |
| 5,047,625 | 9/1991 | Iima et al. . |
| 5,097,354 | 3/1992 | Goto ................................. 359/212 |
| 5,115,120 | 5/1992 | Eastman et al. ................... 235/462 |
| 5,170,277 | 12/1992 | Bard et al. . |

OPTICAL SCANNER WITH SCANNING LIGHT BEAM AND DETECTOR FIELD OF VIEW

CROSS REFERENCE TO RELATED APPLICATIONS

This application is a division of application Ser. No. 07/897,664, filed on Jun. 12, 1992, now U.S. Pat. No. 5,374,817 which is a continuation-in-part of application Ser. No. 07/787,458 filed on Nov. 4, 1991, now abandoned which is in turn a continuation-in-part of application Ser. No. 07/699,417 filed on May 13, 1991, now U.S. Pat. No. 5,191,197 which is in turn a continuation-in-part of application Ser. No. 07/193,265 filed May 11, 1988 and which issued on Sep. 1, 1992 as U.S. Pat. No. 5,144,120, all of which are herein entirely incorporated by reference.

TECHNICAL FIELD

The present invention relates to optical scanners for optically reading information, such as bar codes. In particular, this invention relates to a system and method for reading optically encoded information by scanning both the light beam and the field of view of the optical detector.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols.

Laser scanner systems and components of the type exemplified by U.S. Pat. Nos. 4,251,798; 4,360,798; 4,369,361; 4,387,297; 4,593,186; 4,496,831;4,409,470; 4,460,120; 4,607,156; 4,673,803; 4,736,095; 4,758,717; 4,816,660; 4,808,804; 4,816,661; 4,760,248; 4,871,904; 4,806,742; and 4,845,350, as well as U.S. application Ser. Nos. 07/148,669 and 07/147,708—all of these patents and patent applications being owned by the assignee of the instant invention and being incorporated by reference herein—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Often the particular application for the bar code reader requires that the optical scanner be constructed in the form of a handheld unit, typically in the form of a pistol. The user points the scanner at the object and operates a trigger to activate the scanning of the bar code. In these handheld units, a light source, such as a visible laser diode (hereinafter VLD) emits a beam of light. To scan the beam across an image, the beam is reflected from a mirror and the mirror is moved in an oscillatory fashion. The oscillation of the mirror causes the reflected beam to scan back and forth in a desired pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

In optical scanners of the type discussed above, the mirror and means to oscillate the mirror add size and weight to the handheld scanner. In applications involving protracted use, a large heavy handheld unit can produce fatigue. When use of the scanner produces fatigue or is in some way inconvenient, the user is reluctant to operate the scanner, which defeats the data gathering purposes for which bar code systems are intended.

Another problem with scanners of the type discussed above relates to the scan field and the size of the spot at the point where the beam impacts on the information. In scanning applications, such as reading bar codes, it is important to maintain the spot size of the beam on the scanned surface essentially at a constant across the entire length of the scanned information. Lasers emit a narrow core of radiation referred to as the laser beam. The beam cross-section varies as the laser beam propagates, particularly after focusing thereof by a lens. The minimum beam diameter is called the "beam waist." In the prior art, the scanning element, e.g. the moveable mirror, typically is positioned after the objective lens so as to scan the focused beam. Such scanning is referred to as "post objective" scanning. The objective lens in such scanners only needs to be slightly larger than the beam, and the scanning mirror can be somewhat smaller than the beam diameter. The mirror rotation, however, produces a curved or arcuate scan of the focal point of the beam. This curved scan field means that the focal point of the beam actually moves into and out of the plane of the information being scanned, and the part of the beam which impacts the plane of the information changes. Consequently, the spot size changes substantially from point to point along the scan line on the information surface. Such variations in spot size cause the intensity of light reflection sensed by the photodetector to vary, which may interfere with accurate sensing of reflection variations due to variations in the scanned information.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocally driven to jointly move all the aforementioned components back and forth over a bar code symbol to be scanned. The large volume and heavy mass of all the commonly mounted non-laser system components require the expenditure of a great deal of power for the driver. This is not altogether practical in those cases, e.g. battery-powered operation, where power consumption is to be held to a minimum. Also, moving only one or more non-mirrored system components relative to another for conserving power was heretofore not considered desirable, because of optical alignment problems.

The components for the light scanning system, including the light source, optics, photo-detector, scanning component and an electrical conductor, can be mounted together in a common assembly to constitute a compact, lightweight, scan module. Such a scan module is mounted in an interchangeable, modular manner in housings of different configurations. For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766,299) or on one or more fingers of the operator's hand, typically with the aid of a strap, a clip, or a glove. The housing can be mounted on a countertop workstation. The housing can be mounted in a mobile cart, or shopping cart, or, in some cases, even in a stationary installation.

Commonly assigned application Ser. No. 07/193,265 filed May 11, 1988 discloses a mirrorless optical scanner, and application Ser. No. 07/699,417 filed on May 13, 1991 discloses incorporation of such a scanner in a modular scanner component system facilitating use of the scanner in a variety of different housing configurations.

A need still exists, however, to further reduce the size and weight of the scanner unit and to provide a particularly convenient scanner system. The mass of the moving components should be as low as possible to minimize the power required to produce the scanning movement and to facilitate operation at high scanning speeds.

DISCLOSURE OF THE INVENTION

Objectives

The objective of this invention is to provide a method for reading or scanning optically encoded information which will allow the use of a scanner which is smaller and lighter weight, particularly when held by an operator, and which is easier to manipulate to scan encoded data.

A further objective is to provide a method for reading or scanning optically encoded information which facilitates the use of a durable robust scanning system at a relatively low cost.

To reduce weight and achieve a higher degree of miniaturization, it is a specific object of this invention to provide a method for scanning or reading optically encoded information without using a mirror.

Another objective of the invention is to provide a method for scanning or reading optically encoded information which facilitates a reduction in the mass of the components which actually move to scan the beam and which accordingly reduces the power required to produce the movement and facilitates operation of the scanner at high scanning frequencies.

SUMMARY

In accordance with the invention, an optical reading system for reading optically encoded information includes a light emitter for producing a beam of light directed towards a target having an optically encoded symbol, and a light detector for detecting light reflected from the symbol to read the optically encoded information. The light emitter and detector are mounted on a rotatable shaft. A drive rotates the shaft to oscillate the light emitter and light detector. A flexible electrical conductor is connected to the light emitter at one end. The electrical conductor is affixed between its two ends at a point substantially coincident with a point on a longitudinal axis of the shaft.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
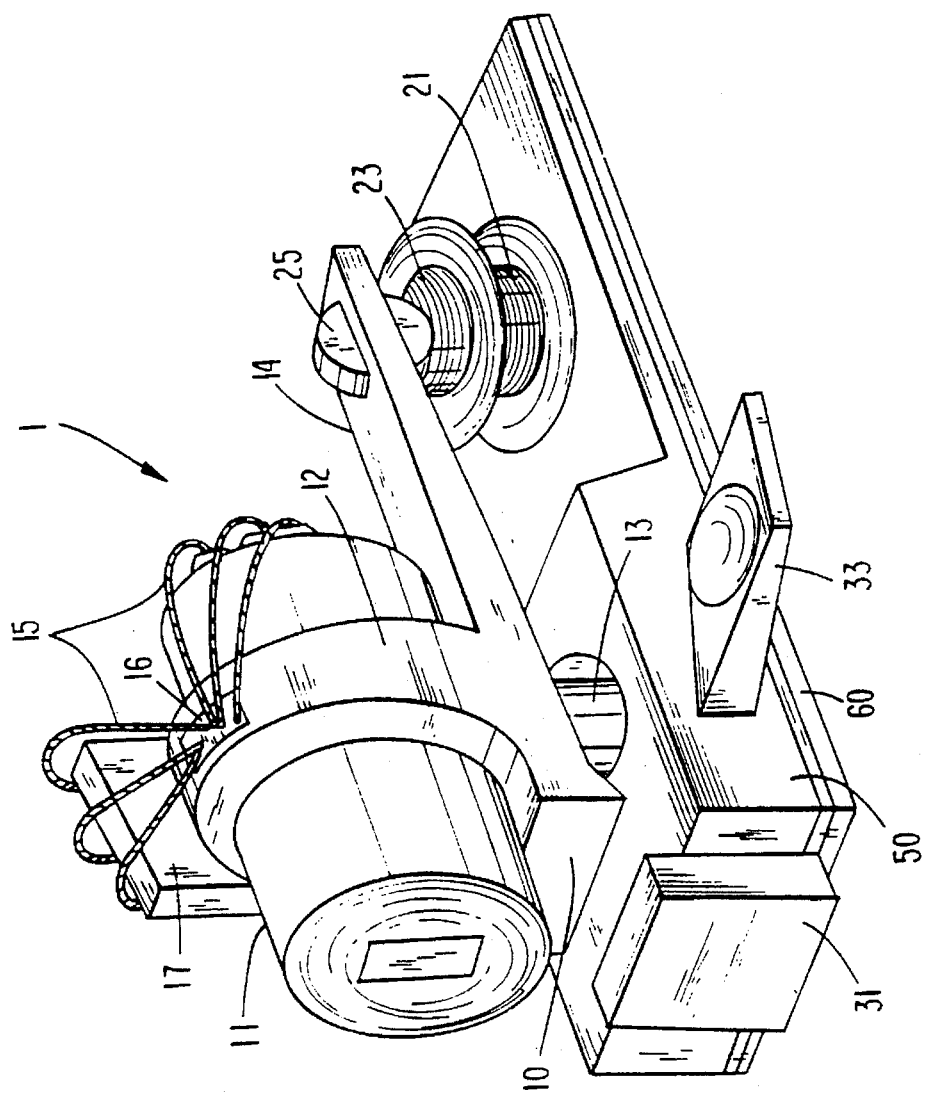
FIG. 1 is an isometric view of a first embodiment of the mirrorless scanner of the present invention, wherein the light emitter reciprocates.

FIG. 1 depicts a mirrorless scanning unit 1 of the present invention. A light emitter, such as a visible laser diode or VLD 11, emits a beam of light to generate a scan line. The VLD 11 may be mounted on the pivotable shaft of a motor or on any material means capable of producing oscillating motion.

In the preferred embodiment of scanning unit 1, the VLD 11 is attached to the top end of a rotatable or pivotable shaft 13. The shaft 13 is pivotably mounted in a scanner base 50. The shaft can be installed either on any known type of bearing 61 or just to rotate in the plastic body of base 50. The VLD 11 and shaft 13 together form a moving assembly 10 for scanning the beam of light from the VLD type light emitter. The moving assembly 10 also includes a collar 12 and a lever arm 14 attached to the shaft 13. A force applied to the end of lever arm 14 produces the oscillatory movement of assembly 10, as will be discussed later.

The collar 12 secures the VLD 11 to the moving assembly 10. In the preferred embodiment, the VLD 11 is secured at a point atop of the shaft 13, such that the VLD 11 is effectively located on the pivot axis of the shaft 13 and aligned to emit light in a direction perpendicular to the axis of the shaft. Other arrangements of the VLD and shaft are possible. For example, the VLD could be located at a position offset from the axis. Also, the collar could support the VLD at an angle with respect to the shaft.

Figure 2:
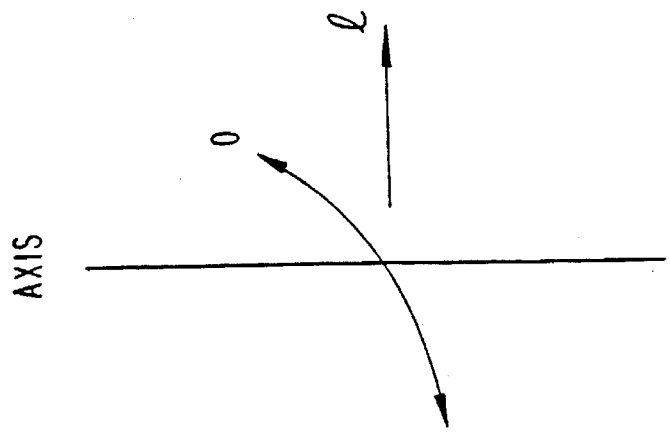
FIG. 2 is a diagram showing the rotational arc of the emitter oscillation and the direction in which light is emitted.

FIG. 2 illustrates the relationship of the motion and light emission of the VLD 11 to the axis of the shaft 13. The short rotational arc o about the shaft axis represents the back and forth pivotal oscillation of the VLD 11. The VLD 11 emits light in direction 1 toward a targeted object, such as a bar code (not shown). As the VLD 11 of assembly 10 oscillates back and forth through the small rotational arc o, the emitted light 1 will scan back and forth across the targeted image. Typically, the targeted image will be an indicia having varying reflective characteristics which represent information. For example, the image code comprises a series of bars, with spaces therebetween, which together form a bar code symbol.

As shown in FIG. 1, three thin wires 15 connect the leads of the VLD 11 on one side to a stationary holder 17 on the other. Alternatively, one flexible cable could be used. In the preferred embodiment, the wires 15 or cable are attached to an intermediate fixing point 16 atop the collar 12. The point 16 is located on the axis of the oscillation of moving assembly 10 and shaft 13 to minimize tension on the lead wires due to the zero linear speed at that point. Alternatively, the wires could be slack and hang loose or be coiled, so long as the wires provide a flexible connection to the oscillating VLD. In embodiments discussed later with respect to FIGS. 25 to 27, the wires comprise a flexible flat wire cable.

A variety of devices can be used to provide the force to oscillate the moving assembly 10 about the axis of shaft 13. In the illustrated embodiment, the oscillation of the assembly is provided by a so-called induced magnetization motor (hereinafter IMM).

The IMM type motor has been disclosed in commonly assigned application Ser. No. 07/520,464 now U.S. Pat. No. 5,168,149, filed on May 8, 1990, entitled SCANNING ARRANGEMENT, which is herein incorporated entirely by reference. In that prior application the IMM oscillated a scanning mirror. In the IMM type motor, a restoring force is provided by the combination of a fixed position core and coil with a moveable permanent magnet. In embodiments using the flexible flat wire cable, the flat wire also provides a restoring force. If the permanent magnet is mounted on the end of a lever arm attached to a rotatable shaft, the force takes the form of a torque about the axis of the shaft.

In the present embodiment of the IMM, a core 21 comprises a bobbin around which the coil 23 is wound such that the core and coil are entirely concentric to minimize size and weight. The permanent magnet 25 is rigidly mounted at the end of the lever arm 14 of the moving assembly 10. Location of the permanent magnet 25 at a distance from the axis of the shaft 13 causes the magnetic force applied to the lever arm 14 through the permanent magnet 25 to produce a torque about the axis of the shaft 13.

The core 21 is made of a soft steel to prevent residual magnetization and is magnetically neutral in this case. When there is no current through the coil 23, axially magnetized permanent magnet 25, which is attached to the moving assembly through the lever arm, positions itself above the central axis of the core 21 by the attraction of the magnet 25 to the steel of the core 21. Thus, with no current flowing through coil 23, the moving assembly returns to its rest position at the center of its rotational arc, i.e. facing straight forward.

When a current is introduced through the coil 23, interaction between magnetic fields of the coil and the permanent magnet 25 causes the magnet (with the attached moving assembly) to move from an equilibrium position. As a result of such motion, however, the core becomes increasingly magnetized, thus creating a force (two unlike magnetic poles phenomena) which is trying to bring the permanent magnet 25 and the assembly 10 back to the rest position. The magnitude of this force depends on the amount of current through the coil 23, the airgap size between the permanent magnet 25 and a core surface, the size and the material of the core 21, etc. Reversing the polarity of the applied current will reverse the directions of the magnetic forces at work within the IMM. Therefore, if the current applied to the coil takes the form of a cyclical AC signal, such as a sign wave, a pulse signal, a triangular wave, etc., the induced magnetic forces will produce an oscillatory movement of the permanent magnet 25 and the attached moving assembly 10.

Although the IMM is preferred for the embodiment of FIG. 1, other arrangements could produce the necessary oscillatory motion. For example, the VLD 11 could be installed on the rotating shaft of a motor (see, e.g., FIG. 26). Also, if the IMM is used, other arrangements for mounting the VLD and connecting the moving assembly to the IMM are within the scope of the present invention. For example, in place of the shaft and lever arm arrangement shown in the drawings, the permanent magnet and VLD could both be mounted on a moveable or flexible bridge support directly over the bobbin coil so that the permanent magnet and VLD oscillate laterally together in response to the cyclical AC signal applied to the bobbin coil.

When used as a scanner for reading optically encoded information, such as a bar code, the scanner also includes a light detector, such as photodiode 31. As shown in FIG. 1, the front of the scanner base 50 supports photodiode 31 in a position and orientation whereby light from the VLD 11 reflected by a scanned image impinges on the light sensitive area of photodiode 31. The photodiode 31 receives an amount of light reflected back from the target, e.g. a bar code label, and converts that reflected light into an electrical current. A filter, pre-amplification and amplification stages may be provided on a printed circuit board 60 shown attached to the bottom of the scanner base 50. The pre-amplification and amplification stages convert a current from photodiode 31 into an electrical signal to be sent to digitizer and the rest of a processing circuitry contained in a separate unit.

A trigger button 33 is mounted on one side of the unit. A user operates button 33 to activate the unit.

In an embodiment actually built, the mirrorless scanning unit was only 1" long, by 1.25" high, by 0.625" wide. The exterior dimensions of a housing containing the mirrorless scanner are 1.1" long, by 1.4" high, by 0.7" wide. It takes only 13.5 mA and 3.5 V to operate the mirrorless scanner. Scan angle is ±20°. Unit weight is less than one ounce (27.5 grams). Such a small scanner unit could easily be worn on a finger like an ordinary ring, leaving the operator's hands (including that finger) absolutely free.

The working range or decode zone can be changed by refocusing the VLD (for the beginning of the working range) and by the installation of a Fresnel lens 70 in front of the photodiode or by using a photodiode with a larger sensitivity and active area.

Figure 3:
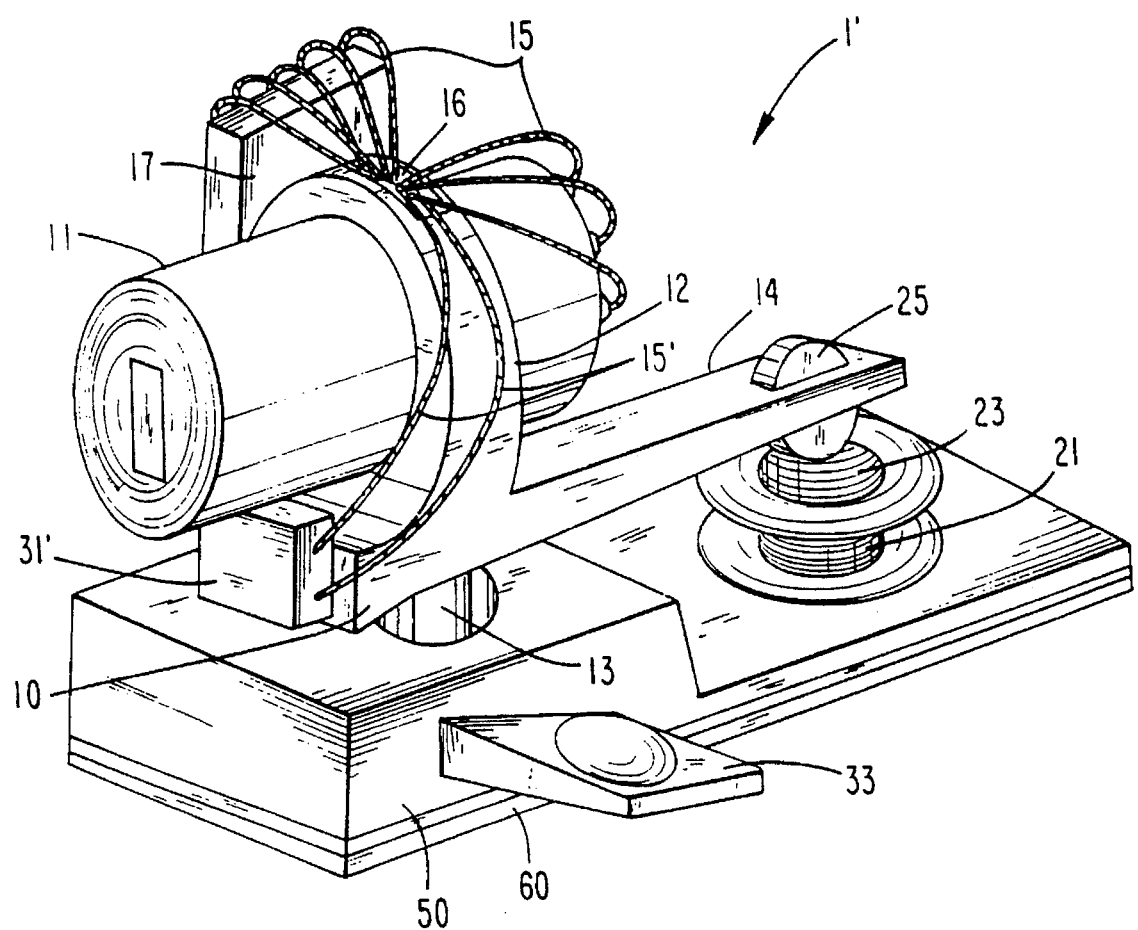
FIG. 3 is an isometric view of a second embodiment of the mirrorless scanner of the present invention, wherein the light detector also reciprocates.

FIG. 3 shows a second embodiment of the mirrorless scanner. The scanner 1' of FIG. 3 is generally similar to the scanner 1 shown in FIG. 1, and like reference numerals indicate corresponding elements of the scanner in each drawing. As shown in FIG. 3, two thin wires 15' connect the leads of the photodiode 31' to the stationary holder 17. The wires 15' are attached to the intermediate fixing point 16 atop the collar 12 in the same manner as the wires 15 from VLD 11.

In FIG. 3, the photodiode 31' and Fresnel lens 70' oscillates with the VLD 11. The photodiode 31' is located on the front of the moving assembly 10 directly below the VLD 11. The photodiode 31', like VLD 11, oscillates back and forth through a short rotational arc about the axis of shaft 13. The receptor photodiode 31' therefore closely tracks the motion of the oscillating emitter, VLD 11.

Figure 4:
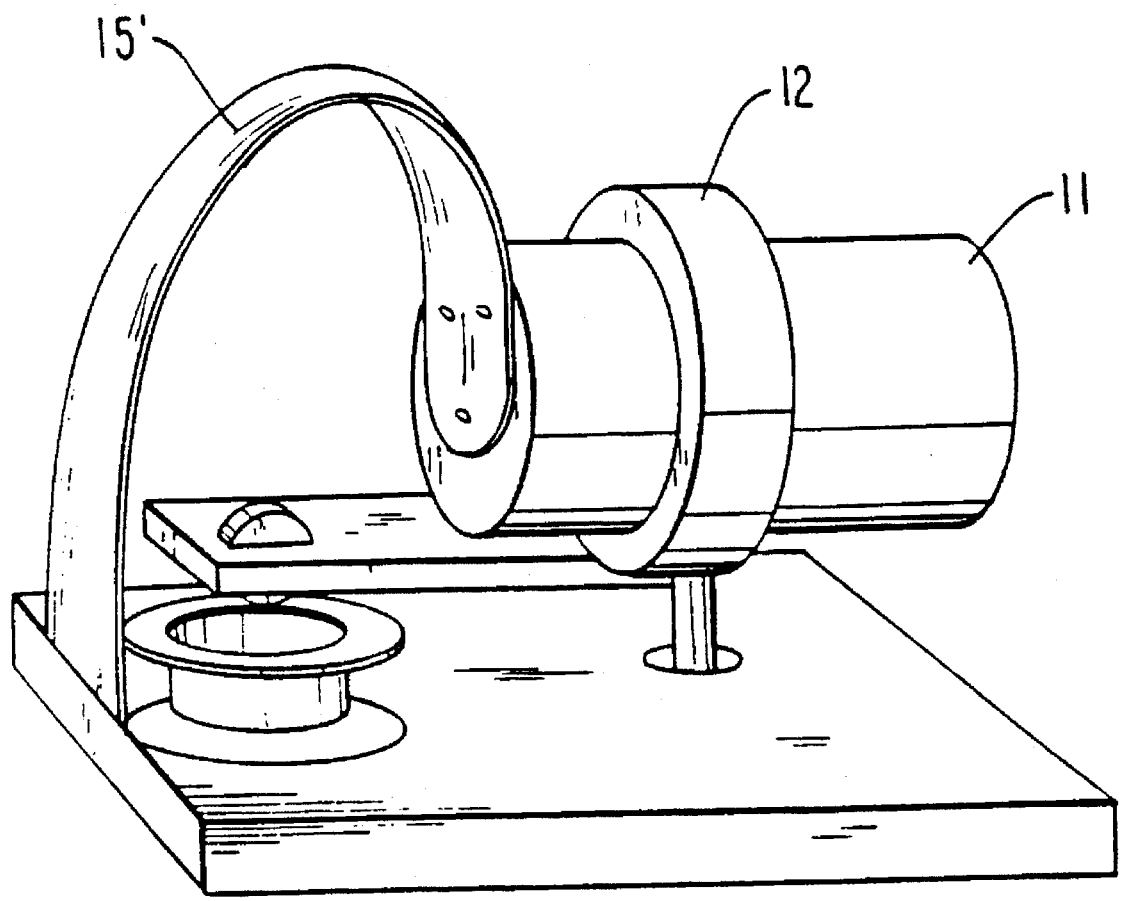
FIG. 4 shows an embodiment of the invention, similar to that of FIG. 1, using a flexible flat wire cable to provide the lead wire connection to the laser diode.

FIG. 4 shows an embodiment of the invention, similar to that of FIG. 1. The embodiment of FIG. 25, however, replaces the wire leads with a flat flexible multi-wire cable 15', often referred to as a "flex-cable," to provide the lead wire connection to the visible laser diode VLD 11. Typically the "flex-cable" might comprise a flat strip of Kaptan material with wires embedded therein. The flexible multi-wire cable 15' provides a durable connection which is not susceptible to breakage due to repeated flexure during oscillation of the laser diode. Also, the multi-wire cable provides part or all of the restoring force necessary to operate the device.

The multi-wire cable can take any of a number of forms and will typically comprise a flexible flat wire cable. Any other flexible flat wire cable could be used so long as the structure provides sufficient flexibility.

Housings for hand-held bar code readers are easily adaptable for housing the beam scanning modules depicted in FIGS. 1–4. The housing may be cylindrical, like the housing of a flashlight or a ballpoint pen. Because of the small size of the scanning module and associated electronics, the housing may have a diameter of 1 inch or less. Control circuitry provides the drive signals necessary to operate the laser and to control operation of the scanner motor. Such circuitry can also be disposed within the housing. The focussed beam from the laser light source passes along a path during oscillations to sweep the beam spot in an arc across the encoded information or bar code symbol. A portion of the light reflected off the symbol passes along a return path to the detector.

To scan code information using a cylindrical hand-held scanner, the user points the tip of the scanner at the information and activates the trigger button. The laser diode then emits a beam which scans the encoded information. The photodetector detects the reflected light and outputs an analog electrical signal representing the scanned symbol. The unit can be powered by a battery pack mounted in the housing which supplies power for the scanning motor and all circuitry of the hand-held bar code scanner.

The housing may also be a gun-shaped light-weight housing. Batteries may be mounted within a pistol-type grip of the housing to provide power to all elements of the hand-held scanner. A printed circuit board containing control circuitry can be provided for producing the signals to drive the scan element. Such a printed circuit board may also contain signal processing circuitry and microprocessor circuitry. The gun-shaped housing is designed such that the user aims the device at a bar code symbol from a position at which there is a space between the reader and symbol. The front of the reader does not touch the target surface on which the symbol is formed. Instead, the operation of the scanning module causes the beam to scan across the symbol.

The light from the laser diode within the scanning module is typically in the visible light portion of the spectrum. As a result, the user can see the light as the beam scans across the surface on which the symbol is formed. The user employs this visible light to accurately aim the reader at the symbol.

The reader may also function as a portable computer terminal, and in such embodiments would include a keyboard and a display, as described in U.S. Pat. No. 4,409,470.

The scanning modules disclosed herein can each be used in a wide variety of optical scanner configurations. Clearly, the mirrorless scanners of the present invention provide a particularly small, light-weight, durable optical scanner.

What is claimed is:

1. A method of operating a light emitter and a light detector to read optically encoded indicia located on a target, each of said light emitter and said light detector having at least one electrical conductor for providing electrical energy connected thereto, comprising the steps of:

affixing a portion of each said at least one electrical conductor between distal end portions thereof at a point coincident with a point on an axis of rotation;

oscillating said light emitter about said axis of rotation to scan a beam of light along a path within a field of view;

oscillating said light detector about said axis of rotation;

detecting light reflected from said indicia with said oscillating light detector; and generating an electrical signal corresponding to said detected light and representing said encoded indicia.

2. A method as in claim 1, wherein said light emitter and light detector are oscillated laterally.

3. A method as in claim 1, further comprising the step of focussing the reflected light through a lens.

4. A method as in claim 3, wherein said lens is a Fresnel lens.

5. A method as in claim 3, wherein said lens is oscillating.

6. A method as in claim 1, wherein said light detector is a photodetector.

7. A method as in claim 1, wherein said light emitter is a laser diode.

8. A method as in claim 1, wherein said beam of light is a visible light beam and is generated by said light emitter.

9. A method as in claim 1, wherein movement of said oscillating light detector substantially tracks movement of said oscillating light emitter.

10. A method as in claim 1, wherein said axis of rotation is a longitudinal axis of a rigid shaft for oscillating said light emitter and said light detector.

11. A method as in claim 1, wherein said light detector and said light emitter are substantially aligned in a direction of said axis of rotation.

12. A method as in claim 1, wherein said oscillating light emitter and said oscillating light detector rotate through a common angle.

13. A method as in claim 1, wherein said steps of oscillating said light emitter and oscillating said light detector include application of an electrical force to cause movement of said light emitter and said light detector.

14. A method as in claim 1, further comprising the step of focussing the reflected light through a lens, and oscillating said lens about the axis of rotation.

15. An optical reading system for reading optically encoded information represented by a symbol on a target comprising:

a rotational shaft;

a light emitter for producing a beam of light to scan a path through a scan field;

a light detector for detecting light reflected from said symbol to read said optically encoded information;

means for oscillating said light emitter and said light detector about a longitudinal axis of said rotational shaft; and at least one electrical conductor connected to each of said light emitter and said light detector for providing electrical energy thereto;

wherein, each said at least one electrical conductor is affixed between distal ends thereof at a point coincident with a point on the longitudinal axis of said rotational shaft.

16. An optical reading system as in claim 15, wherein said shaft is rigid.

17. A system as in claim 15, wherein said oscillating means further includes:

a base for supporting a first end of said shaft; and means disposed between said base and said first end of the shaft to rotationally connect the first end of the shaft to said base.

18. A system as in claim 17, wherein said means disposed between said base and said first end of the shaft is a bearing.

19. A system as in claim 15, wherein said oscillating means includes:

an assembly attached to said shaft and having a means for supporting said light emitter and said light detector, and a lever arm extending away from the longitudinal axis of said shaft; and means for providing a force to a distal end of said lever arm to impart a torque on said shaft and thereby oscillate said light emitter and said light detector.

20. A system as in claim 19, wherein said force is an electro-magnetic force and said lever arm has a permanent magnet attached to said distal end thereof.

21. A system as in claim 15, wherein:

said light emitter is mounted proximate to a first end of said shaft; and said light detector is mounted between said light emitter and a second end of said shaft.

22. A system as in claim 15, wherein said oscillating means includes an induced magnetization motor.

23. A system as in claim 15, wherein each said at least one electrical conductor has a distal end portion affixed to a member, said member being stationary in relation to said oscillating light emitter and said oscillating light detector.

24. A system as in claim 15, further comprising a circuit board for converting electrical current from said light detector into an analog electrical signal representing said optically encoded information.

25. A system as in claim 15, further comprising a activating means operable by a user to activate said system.

26. A system as in claim 25, wherein said activating means includes a trigger switch.

27. A system as in claim 15, wherein said at least one electrical conductor connected to said light emitter includes a multi-wire conductor.

28. A system as in claim 27, wherein said multi-wire conductor includes electrical wires embedded in a flexible material.

29. An optical reading system for reading optically encoded information represented by a symbol on a target comprising:

a rigid shaft;

a light emitter for producing a beam of light directed towards said target, wherein said light emitter is mounted to said shaft;

a light detector for detecting light reflected from said symbol to read said optically encoded information, wherein said light detector is mounted to said shaft;

means for rotating said shaft to oscillate said light emitter and said light detector; and a flexible electrical conductor;

wherein a first end of said conductor is connected to said light emitter and a portion of said conductor between said first end and a second end of said conductor is affixed at a point substantially coincident with a point on a longitudinal axis of said shaft.

30. An optical reading system as in claim 29, wherein:

said light emitter and said light detector are oscillated through a common angle about said longitudinal axis of said shaft; and said means for rotating includes electro-magnetic means for imparting a torque to said shaft.

31. A system as in claim 29, further comprising a support member, wherein the second end of said conductor is connected to said member and said member is stationary in relation to said rotating shaft.

* * * * *